United States Patent [19]
Butz

[11] 3,849,226
[45] Nov. 19, 1974

[54] PRODUCING FIBER REINFORCED RESIN PANELS WITH GELCOAT FIBER LAYER AND LACQUER PROTECTIVE

[75] Inventor: Josef Butz, Weiden, Germany

[73] Assignee: Flachglas Ag Delog-Detag, Fuerth/Bayern, Germany

[22] Filed: Aug. 14, 1972

[21] Appl. No.: 280,188

[30] Foreign Application Priority Data
Aug. 26, 1971 Germany............................ 2142731

[52] U.S. Cl.................. 156/247, 156/276, 156/280, 156/309, 161/151
[51] Int. Cl. ............................................. C09j 3/14
[58] Field of Search ........... 156/247, 276, 309, 323, 156/278, 280, 179

[56]           References Cited
            UNITED STATES PATENTS
2,528,168   10/1950   Paulsen............................. 156/323
3,109,763   11/1963   Finger................................ 156/276
3,536,551   10/1970   Simon............................ 156/276 X
3,793,102    2/1974   Day.................................. 156/247

Primary Examiner—George F. Lesmes
Assistant Examiner—Patricia C. Ives
Attorney, Agent, or Firm—Joseph A. Geiger

[57]             ABSTRACT

A method of producing fiber-reinforced resin panels with a gelcoat-type protective cover layer where the freshly impregnated fiber layer covered by film is first heated until the resin gels, whereupon the cover film is peeled off and a protective layer of similar resin or of unrelated lacquer is applied to the gelled resin-impregnated fiber layer and the laminate is cured to harden.

6 Claims, 1 Drawing Figure

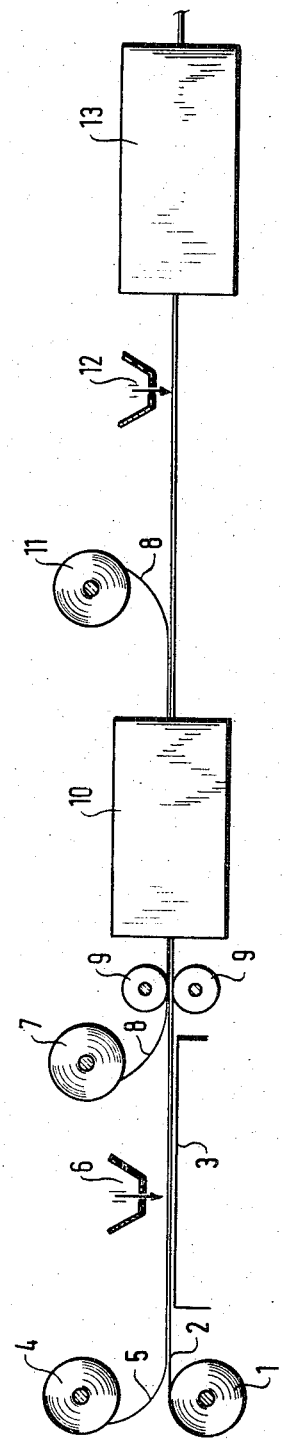

PRODUCING FIBER REINFORCED RESIN PANELS WITH GELCOAT FIBER LAYER AND LACQUER PROTECTIVE

BACKGROUND OF THE INVENTION

1. Field of the Invention

The present invention relates to methods of producing resin panels, and in particular to methods of producing fiber-reinforced resin panels with a so-called "gelcoat" on at least one of the two panel surfaces.

2. Description of the Prior Art

It is known from the prior art in this field to improve the surface of cured, fiber-reinforced resin panels through the application of an additional layer of resin, the method being generally referred to as a "gelcoat method." The basic technology of this gelcoat method is described in detail in U.S. Pat. No. 3,109,763. It is based upon the experience that in the process of producing fiber-reinforced resin panels some fibers will come to be positioned very close to the panel surface so that only an extremely thin layer of resin will be covering them. According to British Pat. No. 899,307, which likewise teaches a gelcoat method, it may even happen that some of the fibers protrude to the panel outside (Page 1, lines 19–21). Even where there remains a thin resin film on top of those fibers which are close to the panel surface, this thin film is easily destroyed through wear or through the influence of weather conditions. The results may be discoloration of the translucent panels, with a consequent reduction in their light permeability, due especially to possible soilage of the exposed fibers.

The basic contribution of the gelcoat method is its suggestion of applying to the fiber-reinforced, not yet fully cured resin panel a pure, i.e., fiber-free layer of resin, which, when cured produces a firm bond with the fiber-reinforced resin panel. The crux of the gelcoat method lies in the fact, as implied by its name, that the additional resin layer is applied as a gel. This additional layer will in the following discussion be referred to more generally as the protective layer.

If one were to apply onto a not yet cured fiber-reinforced resin panel a liquid protective layer, one would obtain the inevitable result of the resin of the protective layer becoming admixed to and penetrating the resin of the fiber layer. It is therefore necessary to apply the resin for the protective layer in a state which assures that it will indeed result in a fiber-free outer layer on the panel. Such a result is obtained when the protective layer is gelled by bringing it to a state which lies between the liquid state and the solid state of the resin.

In order to reach the above-described result, one may proceed in two ways, viz. by applying as a protective layer an already gelled thixotropic resin, or by applying a liquid resin. In both cases the protective layer is in a gel state when it comes in contact with the fiber resin layer.

Detailed indications about the types of resins which are suitable for this method are given in U.S. Pat. No. 3,109,763. The latter also mentions in particular the suitability of silica gels as thixotropic gels (Column 8, lines 69–75).

In the following will be described some prior art methods suggested for the application of the protective layer, which may serve as a basis for an explanation of the present invention.

The application methods based upon U.S. Pat. No. 3,109,763 and upon British Pat. No. 899,307 are basically similar to one another. The resin for the protective layer is first deposited in the liquid state onto the inside of a cover film, or as the case may be, two cover films, then gelled, whereupon the film or films carrying the gelled layer of resin are applied to the fiber-resin layer with the resin side contacting the fiber-resin layer, and the laminate thus formed is then cured. A solid molecular bond is created between the resin of the protective layer and the resin of the fiber layer. Lastly, the cover films are peeled off the laminate panels which present, as an end product, cured, fiber-reinforced resin panels with a protective outer layer of resin on one or both sides of the panels.

In contrast to the above-described technologically similar methods, German Offenlegungsschrift No. 1,629,698 teaches a method which is substantially different. No cover films are used in this case, but it is proposed to use a traveling carrier element, especially a metal band. The resin for the protective layer is applied in the liquid state onto this band. The resin layer thus deposited is then gelled by heating and joined from above with a fiber layer which is then impregnated with liquid, hardenable resin, whereupon the resin-impregnated fiber layer, covered from underneath by the protective layer, is passed through a curing oven in order to bond the resin of the gelled outer layer to the impregnating resin of the fiber reinforcement. No practical application of this method has become known in the past. A first question in this regard relates to the shaping of this fiber-reinforced resin panel without the aid of cover films, It could hardly be assumed that such a laminate without cover films would have a longitudinal pull resistance which is sufficient to permit pulling of the laminate through the treatment installation. It is one of the basic purposes of the cover films to provide this pull resistance. Additional problems are anticipated in regard to the use of a metal band as a carrier for the protective layer, in view of the apparatus requirements for such method on the one hand, and because it precludes any shaping of the fiber panel in other than a simple flat outline. This method would make it impossible to produce, for example, undulated fiber-resin panels.

The earlier described methods according to U.S. Pat. No. 3,109,763 and the British Pat. No. 899,307 likewise require complicated and expensive machinery for their application. Both of them require an additonal installation for the deposition of the resin for the protective layer onto the cover film. In the case where a not yet gelled resin is used, the additional equipment also has to include a gelling station. In all cases it is also necessary to provide an inversing drum which orients the gel carrying film upside-down so that it can be applied to the fiber-resin layer.

SUMMARY OF THE INVENTION

It is a primary objective of the present invention to suggest a major simplification of the earlier described known methods. The invention attains this objective by proposing a method in which a resin-impregnated fiber layer with two cover films is first gelled, whereupon one cover film is peeled off, and the protective resin layer is applied directly onto the gelled-fiber resin layer.

Essentially, therefore, the improvement resides in a transfer of the step of gelling from the protective layer to the fiber-resin layer, thereby permitting the application of the resin for the protective layer in the liquid state. It may be desirable, under special circumstances, to apply the protective layer onto the gelled resin-impregnated fiber layer in the form of a thixotropic gel. This can be done without departing from the method of the invention which resides in the application of the protective layer directly onto the gelled fiber-resin layer after the peeling-off of the cover films.

In addition to a considerable simplification of the method of applying protective layers to fiber-resin panels, the invention affords several other advantages.

In general, the application of a protective layer onto a film is complicated, not only as regards the necessary apparatus, but also as regards the operation itself. Certain film materials and resins used for this purpose have a tendency to form wrinkles or develop fissures in the film web, as the heating of the film which carries the resin for the protective layer can create mechanical tensions between these two elements. In other cases the carrier film may become too brittle, which leads to similar wrinkles or fissures. These deficiencies are eliminated by the invention, because the protective layer is applied directly to the gelled resin-reinforced fiber layer.

In the case where the resin for the protective layer is applied by spraying, it is sometimes difficult to avoid at least partial spraying of the film edges. If the latter occurs, it becomes more difficult to laterally stretch the carrier film, this stretching being necessary in order to maintain the film surface even and the thickness of resin layer uniform.

A further previous shortcoming is eliminated by the present invention, in that very large panels previously required two widths of cover film which were glued together side-by-side in order to obtain the necessary width. Such a film joint has a small longitudinal surface step which would be transferred to the thin layer of protective resin. It should be kept in mind that these layers of protective resin are generally very thin.

The direct application of the protective layer onto the gelled, still hot fiber-resin layer furthermore makes it possible to use the heat of the fiber-resin layer for the curing of the protective layer in addition to the heat released by the curing of the resin-impregnated fiber layer which occurs in an exothermic reaction.

The method of the invention as described so far relates to the application of a protective layer on only one side of the resin-impregnated fiber layer. However, it is also possible with this method to apply such a layer on both sides, in which case a more complicated mechanical installation is required. Such an installation would have to include, following the station in which the first protective layer is applied, an inversion station in which the laminate web is turned upside-down, before the second protective layer can be applied to the new upper side of the fiber layer. For most practical purposes, however, it is sufficient to have only that side of the fiber-reinforced resin panels covered by a protective layer which is exposed to possible panel damaging influences.

BRIEF DESCRIPTION OF THE DRAWINGS

Further special features of the invention will become apparent from the description following below, when taken together with the accompanying drawing which illustrates, by way of example, an apparatus suitable for the method embodying the invention which is represented in the figure as follows:

The FIGURE of the drawing is a schematic elevational view of an installation suitable for the performance of the method of the invention.

DESCRIPTION OF THE PREFERRED EMBODIMENT

The method of the invention is practiced, for example, by unwinding from a supply roll 1 a lower cover film 2 which is pulled over a table 3, while a fiber web 5 is unwound from a supply roll 4 and deposited onto the lower cover film 2. A resin applicator 6 impregnates the fiber web 5 with hardenable resin while it passes over table 3. Onto the impregnated fiber layer 5 is then deposited a second cover film 8 which is unrolled from a supply roll 7. The laminate consisting of the two cover films 2 and 8 holding between them the resin-impregnated fiber layer 5 is now passed through a pair of squeeze rollers 9, whereby it is flattened and any remaining air inclusions are expelled. The laminate then passes through a shaping oven 10 in which it is shaped. This may involve longitudinal undulation or transverse undulation for example, or any other desired shape. Simultaneously, the laminate is heated inside oven 10 to point where the resin surrounding the fibers is gelled. After the laminate has left oven 10, the upper cover film 8 is peeled off and wound onto a take-up roll 11, exposing the resin-impregnated fiber web whose resin has gelled.

The laminate with the exposed, gelled resin surface is now passed under a second resin applicator 12 which deposits a protective layer of resin directly onto the impregnated fiber layer. The specific method of depositing this resin layer is immaterial; it may be accomplished for instance by spraying or by means of a wiper, or by still other means. The essential contribution of the invention is the application of the protective resin layer directly onto a gelled, resin-impregnated fiber web. The thus covered fiber web then passes through a curing oven 13 inside which it is cured to its final state. The end product obtained is a fiber-reinforced resin panel with a "gelcoat" on its upper side.

In the case where it is desired to have a gelcoat applied to both sides of the panels, it will of course be necessary to also peel of the lower cover film 2. However, this operation must be accompanied by the inversion of the laminate in order to permit the application of the second protective resin layer from above as was the case with the first protective layer.

The resin used for the protective layer is as a rule of the same kind as the resin used for the impregnation of the fiber material. It is important to note, however, that the new method of the invention also permits the use of other materials in conjunction with, or instead of the gelcoat resin. Thus, it is possible to use for this purpose lacquer-type protective materials which are not related to lamina resins, for example, lacquers based on acrylic resins or so-called D—D lacquers. A variety of other lacquers are likewise usable, including so-called structural lacquers (e.g., mill scale lacquers, metallic gloss lacquers and the like).

As taught in detail in the earlier-mentioned prior art disclosures, particularly in U.S. Pat. No. 3,109,763, the preferred ingredients for the production of fiber-reinforced resin panels are:
Resins The thermosetting resins employed may include various thermosetting materials such as the polyesters and polyester-styrene blends, melamine and alkyd and alkyd silicone resins and variations of the synthetic thermosetting materials which may be made by one skilled in the art to produce a resin originally in a liquid state which is capable of polymerization to a hard, strong, solid mass.

Catalysts

If desired various catalysts may be used to aid in curing the resin, and for this purpose organic peroxide catalysts such as methyl ethyl ketone peroxide, benzoyl peroxide, tertiary butyl perbenzoate and the like are quite satisfactory. If desired, various promoters or accelerators known to the art, such as the mercaptans or cobalt naphthenate may be used.

Dyes

Dyes or pigments of the relatively light fast type which are not affected by the other components of the resin formulation may be employed to impart desired colors either to the resin interlayer and/or to the resin films applied to the surfaces of the interlayer.

Reinforcement agents

Where the panels made in accordance with the present invention are to be employed in awnings or similar applications where it is desired that the products be translucent, a reinforcement material consisting essentially of glass in the form of fibers, floc, random mat, or woven cloth may be incorporated in the liquid resin. such reinforcement materials are especially adapted to the present process and product by virtue of their high strength-weight ratio. However, other reinforcing materials such as chopped synthetic fibers of rayon, nylon, etc., and certain of the vegetable fibers such as cotton jute, hemp and the like may be used. Of course the reinforcemnt materials must not be soluble in the components of the resin interlayer.

Cover films

Films applicable to use in the present invention include those formed of regenerated cellulose (known in the trade as cellophane), cellulose acetate, polyvinyl chloride, vinyl butyral, polyethylene and others, including, if desired, thin films of metal, which are inert with respect to the ingredients contained in the resin and which will strip readily from the surfaces of the cured panels.

What is claimed is:

1. A method of producing fiber-reinforced resin panels comprising the steps of:
   extending a bottom cover film layer;
   depositing onto said bottom cover layer a layer of fibers;
   impregnating said fiber layer with a liquid thixotropic polymerizable resin mix to which the cover film layers and the fibers are inert;
   covering said impregnated fiber layer with a top cover layer, each cover layer being cleanly separable from the resin-impregnated fiber layer at any stage of resin polymerization;
   gelling, at least partially, the resin of the impregnated, bilaterally covered fiber layer;
   separating from the gelled layer at least one of the two cover layers so as to expose the former;
   applying to the exposed gelled resin-impregnated fiber layer a protective layer of a curable coating substance which is free of fibers; and
   curing the superposed resin-impregnated fiber layer and the protective layer, thereby creating a molecular bond between the layers.

2. A resin panel production method as defined in claim 1, wherein:
   the several steps are performed in a continuous operation;
   the bottom cover layer is a cover film being continuously deployed from a roll and advanced over a horizontal support;
   the layer of fibers is a coherent fiber batt being likewise continuously deployed from a roll and deposited onto the advancing bottom cover film;
   the resin mix is continuously flowed onto the advancing deposited fiber batt from a storage container; and
   the top cover layer is likewise a cover film being continuously deployed from a roll and deposited onto the advancing resin-impregnated fiber batt.

3. A resin panel production method as defined in claim 1 wherein
   the step of applying a protective layer involves the continuous spraying of a liquid coating substance onto the advancing gelled, resinimpregnated fiber layer.

4. A resin panel production method as defined in claim 1 wherein
   the step of applying a protective layer involves the application of a liquid layer of polymerizable resin mix similar in composition to that contained in the fiber layer.

5. A resin panel production method as defined in claim 1 wherein
   the step of applying a protective layer involves the application of a liquid layer of lacquer which is inert to and unrelated to the resin mix contained in the fiber layer.

6. A resin panel production method as defined in claim 5, wherein
   the step of applying a protective layer involves the application of a structural-effect lacquer.

* * * * *